Patented Nov. 17, 1942

2,302,309

UNITED STATES PATENT OFFICE 2,302,309

STABILIZATION OF WET PROCESSED STARCH PASTES WITH UREA-FORMALDEHYDE

Sivert N. Glarum, Ardmore, Pa., and Joseph J. Thomas, Springfield, Mass., assignors to Röhm & Haas Company, Philadelphia, Pa.

No Drawing. Application October 19, 1939, Serial No. 300,172

9 Claims. (Cl. 260—9)

This invention relates to homogeneous, modified-starch pastes stabilized with an appreciable proportion of a water-soluble carbamide-aldehyde reaction product and to the process of making such pastes.

In the application of starch for coating or sizing of yarn, fabrics, paper, or other materials it is necessary to treat the raw starch in order to obtain a material which will give a satisfactory deposition possessing the proper degree of such properties as penetration, adhesion, cohesion, plasticity, solubility, body, or other characteristic. It has been the practice to boil starches to produce viscous pastes or to treat starch chemically to obtain thin-boiling pastes of improved penetration. Hydrolysis of starches with the aid of an acidic substance or an enzyme produces pastes which have many highly desirable properties and by proper control of the process of hydrolysis it is possible to emphasize one set of properties in preference to another.

The pastes which are prepared by such wet processes contain varying amounts of soluble starches, dextrines, and sugars, although the last-named products are generally present in definitely limited amount. Extent of hydrolysis is determined and controlled not by chemical composition, however, but by viscosity, body, solubility, or other characteristic, considered alone or in combination. It is not always easy to prepare pastes which have the desired solubility and body along with proper solids content, but, even when this is accomplished, the pastes generally lack stability. They tend to gel and otherwise change on standing so that they are no longer useful for their intended purpose. If no preservative, such as formaldehyde, is added, they also tend to mold or decay on ageing.

It is an object of this invention to provide a method for stabilizing partially hydrolyzed starch pastes. It is an object to render such pastes highly resistant to spoilage by molds or bacteria. It is an object to preserve starch pastes which have been partially liquified by enzymatic action so that a smooth, homogeneous, stable product is obtained. It is an object to increase the utility of amylase-hydrolyzed starch pastes by reaction of the pastes with a water-soluble carbamide-aldehyde addition or condensation product, particularly by the use of methylol or dimethylol urea. It is a further object to stabilize pastes made by the action of enzymes or by the action of chemicals, such as acids or alum. Still other objects are to produce starch pastes which yield sizes of improved resistance to water, to produce starch pastes which are particularly useful as adhesives, to make available stable starch pastes which may be fixed on heating, to utilize the adhesive value of both starch pastes and carbamide-aldehyde condensation products, and to produce starch pastes of particular value for aqueous base printing inks or pastes.

It has been found that the partially hydrolyzed pastes obtainable from starch in a wet way and also the pastes obtained by heating raw starch in water to or above its gelation point may be stabilized by adjusting their pH to the range between 7 and about 10, adding a water-soluble carbamide-aldehyde reaction products, and heating the mixture. Pastes of particular value are obtained when for each four parts of gelatinized starch and/or partially hydrolyzed starch in paste form there are added between one and twelve parts of a water-soluble carbamide-aldehyde reaction product. A higher proportion of the reaction product changes the character and behavior of the pastes. Our copending application Serial No. 300,173, filed Oct. 19, 1939, covers the stabilization of hydrolyzed starch pastes with lower proportions where the adjustment of pH is of little importance. The modified pastes obtained by the procedure described herein remain viscous, homogeneous, stable against changes in properties, and free from decay for extended periods of time.

For the preparation of stable starch pastes there may be used as the starting material raw starch in pure or a crude form obtained from such sources as wheat, rye, corn, potato, sago, cassava, etc. The raw starch or crude material is usually available in a powdered form and is readily taken up with water to form a milk or slurry. If the raw material is in the form of lumps or granules, it is worked with water until a slurry results. For the preparation of starch pastes which are to be used as box gums, in backfilling compositions, for slasher sizes, or similar applications, it is usually sufficient to gelatinize the starch or boil it with water. During this sort of wet processing bursting of starch granules, hydration of the starch, and other changes occur. When pastes of higher solids content, improved penetration, or other special properties are desired, further or other wet processing is advisable. One highly useful type of wet processing comprises the partial hydrolysis of the gelatinized starch with the aid of enzymes. By this treatment pastes are obtained which comprises starch, soluble starch, dextrines, and sugars in proportions determined by the type of diastatic enzyme preparation used and the conditions under which the starch is treated.

Starch may also be partially hydrolyzed, as is known, with the aid of acids and other chemicals, such as alum. Acid hydrolysis may be applied to gelatinized pastes or such hydrolysis may be performed with the ungelatinized slurry. The treatment of starch with alkalies also serves to break down starch to more soluble and more useful forms. The conversion of raw starch to useful pastes by any of the methods involving water as a liquid is herein termed wet processing.

Hydrolysis with the aid of enzymes produces particularly desirable pastes which may be unusually well controlled in their properties. The amylase used may be obtained through the medium of fungi, glands, bacteria, or malt. Comparable results are obtained with enzymes from these different sources, although certain secondary differences in the resulting products are often of importance.

In general, the procedure which is followed in hydrolyzing starch with enzymes is, as stated above, first to gelatinize the starch, and then to allow the enzymes to react with the gelatinized starch until the desired degree of body, viscosity, solubility, etc. is reached. If heat-resistant enzymes are used, they may be mixed with the slurry or milk of raw starch. When the temperature has been raised until gelatinization occurs, the enzymes then begin to act at once. Alternatively, the enzymes may be added after the starch has been gelatinized. This latter procedure is particularly advisable when temperature-sensitive enzymes are employed. In this case the gelatinized paste may be cooled to about 60° C. or less and an amylase, such as one from a pancreatic source, added. Agitation is helpful in promoting the hydrolysis. When the desired properties have been obtained in the paste, the enzymes are deactivated, preferably by increasing the temperature. While pancreatic enzymes on the one hand are deactivated at temperatures as low as 70–80° C., temperatures up to 100° C. may be necessary for the deactivation for enzymes of bacterial origin or from malt.

The time required for enzyme treatment depends upon the particular enzyme preparation used, the temperature of conversion, the ratio of enzyme to starch, the pH of the paste during conversion, the degree of hydrolysis desired, etc. It should be noted that some variation in the final products also results from the choice of enzymes. With the usual commercial preparation of enzymes used at a ratio between 0.25 and 3 parts for 100 parts of starch, the conversion periods vary from about 5 minutes to several hours. Lower or higher ratios of enzymes and starch may be used if proper allowance is made for the change in this ratio. In enzyme hydrolysis the pH is of particular importance and it is advisable to adjust the pH when necessary to the region of optimum activity for the particular enzyme used. In general a pH close to the neutral point is desired. The usual enzyme from fungus, for example, is most effective at a pH of just below 7 and when the starch slurry is below 5.8 or above 7.2 a small amount of alkali, acid, or a neutral buffer may be added, to establish the best conditions.

When increased fluidity or more rapid conversion is required, a larger amount of enzyme may be used, or a longer period of hydrolysis. When a lower degree of hydrolysis is desired, less of the enzyme preparation or a shorter time, or both will accomplish the desired end. Lower temperatures give less rapid conversion. At higher temperatures the rate of inactivation of the enzyme is greater but the rate of hydrolysis is increased. At the higher temperatures the hydrolysis produces primarily soluble starches and dextrines with a minimum of sugars—a preferred condition. It is thus possible to control conditions to yield practically any type of enzyme-converted starch paste desired.

The sensitivity of enzymes to pH allows their inactivation by means other than heat. In particular, the hot paste may be acidified or treated with a coagulating chemical such as alum. Strong acids, however, can be used only with great care and with subsequent neutralization. Organic acids, such as acetic acid, and salts, such as alum, zinc sulfate, etc., are to be preferred if chemical deactivation is used, followed by neutralization.

The hydrolysis of starch in the presence of acid may likewise be controlled to yield modified-starch pastes useful for the sizing of yarns and fabrics, the coating of fibrous sheets, or the binding of paper or other materials together. The hydrolysis with acid bears a close resemblance to the procedure with enzymes, but must be more critically controlled and requires acid-resisting apparatus. There may be used any strong, organic or inorganic acid, such as hydrochloric, nitric, sulfuric, oxalic, acetic, etc., or mixtures of such acids. The hydrolysis is controlled by temperature, concentrations, and time of reaction as is known in the art, and as illustrated, for example, in U. S. Patents 579,827; 642,329; 642,330; 642,331; 675,822 or 742,469. When the desired stage of hydrolysis is reached, the acid is deactivated by neutralization. Chemical hydrolysis may split "hulls" and esters which are usually unaltered by enzymes. As with the enzyme-hydrolysis, the product desired from hydrolysis with the aid of chemicals is a mixture of gelatinized and soluble starches, dextrines, and sugars. The more desirable pastes possessing proper viscosity, adherence, and tackiness contain a minimum of sugars.

The concentration of raw starch used in preparing pastes may vary widely. In general, pastes may be prepared starting with 2 to 60% starch. Even higher solids contents have been obtained by the gradual addition of starch during the process of hydrolysis. Pastes containing low percentages of solids are useful in sizing, stiffening, and finishing fabrics. Pastes made with 2 to 15% starch are suitable for an application such as the tub-sizing of paper. Pastes made from higher concentrations of starch are particularly suitable for beater-sizing or as adhesives for gummed or coated paper, adhesives for envelopes, or adhesives for laminating paper to paper or paper to cloth, etc.

The carbamide-aldehyde reaction products which are useful in this invention are the water-soluble addition or condensation products obtained by reacting urea, thiourea, dicyandiamide, a triazine such as melamine, or other carbamide-type material, alone or in mixtures thereof, with an aldehyde, particularly formaldehyde. The preferred reaction product is urea-formaldehyde in the form of a methylol urea.

The carbamide-aldehyde reaction product is usually added after the desired degree of gelatinization or hydrolysis of the starch has been reached, but in the case of enzymic conversion it is possible to add the reaction product to the neutral slurry before hydrolysis. In such a case it is advisable to redetermine the pH of the hydrolyzed paste before its temperature is raised to inactivate the enzyme and adjust the pH, if necessary, so that it falls between 7 and 10.

Whether gelatinized or hydrolyzed starch pastes are being stabilized, the pH of the pastes must be between 7 and about 10. If the pH is not within these limits, it must be brought there by suitable addition of acid, alkali, or buffer salts, such as formic acid, hydrochloric acid, sodium or potasium hydroxide, sodium carbonate, sodium acetate, borax, etc. The addition of borax is of interest not only because of its buffering action but because of its known effect of bodying starch.

After the pH of the pastes has been adjusted and a carbamide-aldehyde reaction product added, the paste is heated or kept hot, preferably above 80° C. for a short time, a heating period of five to fifteen minutes usually being sufficient in this temperature range to bring about a reaction between the starch paste and the carbamide-aldehyde reaction product. The effect is both chemical and physical. If the mixture of starch paste and carbamide-aldehyde product is not heated, the pastes do not become stable. Upon being heated, the pastes become clearer and, in the case of the more concentrated pastes, they show viscous flow rather than plastic flow which such pastes normally exhibit. The pastes in general no longer tend to set up to a rigid gel or to decay.

Details of the stabilization of starch pastes will be evident from consideration of the following examples:

Example 1

A 20% tapioca starch slurry was gelatinized at 160° F., allowed to cool slightly, and was converted with a pancreatic diastase to a viscous, smooth paste and the diastase deactivated with heat. The pH was adjusted to about 8 by the addition of soda ash. This paste was then mixed with a water-soluble urea-formaldehyde condensate, glycerine, and a sulfonated alkylated phenolic ether (as a wetting agent) to give a paste containing 8% hydrolyzed starch, 20% urea-formaldehyde, 2% glycerine, 2% sulfonated phenolic ether and 68% water and was heated to about 175° F. for fifteen minutes. After the paste had been cooled, 20 parts of monastral blue was thoroughly mixed into it. The resulting paste, suitable for textile printing, was stable over many months.

One part of this pigmented paste was mixed with 3 parts of a 10% starch paste prepared from a mixture of corn and tapioca starches by mild hydrolysis with acid followed by neutralization. The resulting mixture was entirely stable for the several weeks during which time it was used for printing cotton cloth.

Example 2

A slurry of 200 parts of tapioca starch was made in 678 parts of water and 2 parts of a commercial fungus diastase added. The temperature of the slurry was then raised to 149° F. where gelatinization occurred. The starch paste was then maintained for 30 minutes between 149–160° F. A concentrated solution of sodium carbonate was then stirred in until 4 parts of sodium carbonate in all had been added to the mixture. There was then added 120 parts of a viscous, 50% aqueous solution of a urea-formaldehyde condensate. The mixture was thoroughly stirred and the temperature raised to 195° F. for five minutes. The paste was then cooled.

A parallel preparation was made in which all steps were the same as for the preparation just given with the exception of the addition of 4 parts of sodium carbonate. As soon as this paste was cooled, it set to a thick gel which was entirely unsuitable for use.

The preparation in which the pH had been adjusted by the addition of sodium carbonate was, however, a useful, smooth, homogeneous paste which exhibited a viscous flow and which remained unchanged for many weeks during which time it was used as a sizing material for paper. The fluidity of the preparation allowed it to be used without the usual heating required for such starch pastes.

A starch paste prepared as above is suitable for dressing, sizing, coating, and finishing textiles as well as for the tub-sizing of paper.

Example 3

A slurry of 500 parts of tapioca starch and 15 parts of a commercial fungus diastase was prepared in 500 parts of cold water. The temperature of the slurry was raised to about 150° F. and maintained at this point until the starch had gelled. The temperature was then maintained between 150° and 165° F. for 30 minutes. At this time 1000 parts of dextrose was added and thoroughly stirred into the partially converted starch paste which was then heated to 200–210° F. for 15 minutes. There was then added 1000 parts of a viscous, 60% solution of a urea-formaldehyde condensation product and the temperature was maintained at 200–210° F. for another 30 minutes. At this point pH determinations were made and a small amount of sodium acetate was added to bring the pH of the paste to 7.9. The paste was then allowed to cool. It was free-flowing and entirely stable for many months. This preparation was found particularly useful for weighting and finishing fabrics, particularly colored fabrics with which there was no masking of the color because of the clear film which was deposited from this preparation. While the sizing from this paste was not entirely wash-fast, it was definitely more resistant to removal by water than a comparable paste composed of starch alone.

Example 4

A slurry of 100 parts of tapioca starch was prepared in 840 parts of water. While the slurry was being stirred, live steam was blown into it until the starch gelatinized. The pH was then determined and found to be 7.7. A 50% solution of a condensate of urea-formaldehyde in which the excess formaldehyde had been reacted with thiourea was added and thoroughly stirred into the paste. The mass was then heated to 190° F. for five minutes. A thick but smooth, non-gelatinous paste resulted which on cooling was useful as an adhesive and also as a binder for backfilling mixes. For the backfilling of cloth the paste was mixed with talc and clay and applied to the fabric by the usual backfilling procedure. The resulting backfilled fabric was very resistant against dusting out and resistant also to removal of the size by water.

Example 5

A slurry of 800 parts of potato starch was made in 2792 parts of water. The temperature of the slurry was raised until it began to gelatinize (approximately 150° F.) and the pH of the paste was determined. It was found necessary to add a small amount of alkali to bring the pH to 6.5. Eight parts of a commercial fungus diastase preparation was then added and thoroughly stirred through the paste which was then maintained at a temperature between 150–165° F. for one-half hour. Enough alkali was added at this point to bring the pH to approximately 8 and 2000 parts of a crystalline addition product of urea and formaldehyde (dimethylol urea) added. When the urea-formaldehyde product had been thoroughly mixed with the paste, the temperature was raised to 190° F. for ten minutes. The starch paste was then cooled and 200 parts of glycerine, 200 parts of a 20% solution of octyl phenoxyethanol sodium sulfate and 4000 parts of titanium dioxide pigment were thoroughly stirred in. In order to obtain an entirely homogeneous paste the pigmented material was passed through a stone mill. The resultant mixture was a smooth, soft paste, samples of which kept for a year were stable. It is of particular value as a printing ink or paste for producing pigmented effects on textiles or for backfilling cloth. After this printing paste has been applied to fabric, the printed fabric may be heated and the printed fabric rendered quite wash-fast.

Example 6

A slurry of 800 parts of tapioca starch was made with 6792 parts of water and 8 parts of a commercial fungus diastase added. The slurry was heated to 150–160° F. and maintained at this temperature for about one hour. The saturated solution of sodium carbonate was added until the pH of the hydrolyzed starch was well above 7. 2000 parts of powdered methylol urea was added and thoroughly stirred into the paste which was then heated for about 10 minutes at a temperature of 185° F. While the paste was cooling, 200 parts of glycerine and 200 parts of a 20% solution of octylphenoxyethanol sodium sulfate were added. The cool paste was thin and clear with a pH of 7.6.

Samples of this paste were set aside and other samples were taken and by addition of small amounts of acetic acid or sodium carbonate adjusted to pH's of 5.3, 6.2, 9.2, and 9.6 respectively. All samples were then set aside for storage. The sample having a pH of 5.3 became cloudy and set to a thick, lumpy mass within a few hours. The sample having a pH of 6.2 soon became cloudy and gelled within two days. The remaining samples were stable for many weeks.

A preparation entirely comparable with the paste prepared above, except for adjustment of pH during processing, was made. The final product had a pH of 5.8. It rapidly gelled on cooling and, since it could not be diluted, was not smooth, could not readily be handled and was entirely unsuitable for use.

50 parts of the stable starch paste prepared as above was intimately mixed with 50 parts of a 20% ultramarine blue paste to yield a product suitable for printing fabrics. This paste may also be used as the basis of an aqueous base printing ink which is prepared by dilution of the above paste with a thinner starch paste. A mixture of 2.5 parts of a 10% starch paste and one part of the color paste yields a printing material giving excellent results on cotton fabrics. The printed cotton fabric may be heated to 300° F. for about one minute and the printed areas then become fast to laundering.

Example 7

A slurry of 50 parts of corn starch was made with 5619 parts of water and one part of commercial diastase added. The temperature was then raised to 165° F. and the pH of the mixture adjusted to 6.5 by the addition of a small amount of alkali. The temperature was maintained at this point for about 20 minutes. 2.4 parts of soda ash was then added to raise the pH above 8 and 150 parts of a water-soluble, powdered condensate of urea-formaldehyde, in which the excess formaldehyde had been reacted with a small amount of melamine, dissolved in the paste. The temperature was raised to about 195° F. for five minutes. After the mixture was cool, 30 parts of a 20% solution of octylphenoxyethanol sodium sulfate was added, followed by 150 parts of monastral blue pigment. The pH of the final mixture was determined as 8.0.

The preparation was padded onto cotton fabric which was subsequently heated to 300° F. for about one minute to produce a highly colored fabric which was fast to laundering. It was found that the addition of 1% ammonium chloride to the above mixture immediately before application permitted the fixation of the color at temperatures lower than 300° F.

The method of stabilization herein described yields stable, modified-starch pastes which are ready for use and which may be shipped and stored. Concentrated pastes may also be prepared which are capable of dilution, when and where desired. The stabilized pastes may be prepared over a wide range of solids content, viscosity, and composition, such that the pastes are suitable for dressing, sizing, stiffening, coating, filling finishing, or binding many kinds of materials, including paper, cardboard, cloth, linoleum, felts, veneers, wood, pigments, etc. Typical applications of the stabilized pastes are found in the paper industry where they may be used in beater- or tub-sizing, in coating, in laminating, etc.; in textile manufacture where the pastes may be used for slashing warp, for backfilling open fabrics, particularly in conjunction with fillers, such as talc, clay, wood-flock, etc., for stiffening and dressing fabrics such as cotton or spun rayon, for glazing and embossing, etc., for binding pigments in printing pastes, etc.; in miscellaneous applications, such as those requiring the joining of wood and the preparation of veneers, etc.

In some applications, particularly in those in which hot pressing is practiced, a catalyst, such as phthalic, formic, acetic, or lactic acid, an acid amine salt, such as methylamine hydrochloride, an ammonia salt such as ammonium phosphate, ammonium chloride, ammonium thiocyanate, etc. or mixtures of such catalysts, may be added to the modified starch paste shortly before use. The catalyst then ensures the hardening of the carbamide-aldehyde condensate and the adhesive qualities of both the starch products and such condensate may be utilized.

We claim:

1. A method of preparing stable, modified-starch pastes which comprises partially hydrolyzing starch in a wet way to form a paste, adding a water-soluble carbamide-aldehyde reaction product to the paste at a pH between 7 and about 10, and heating the mixture.

2. A method of preparing stable, modified-starch pastes which comprises partially hydrolyzing starch in a wet way to form a paste, adjusting the pH of the paste between 7 and about 10, adding a water-soluble urea-formaldehyde reaction product, and heating the resulting mixture above 80° C.

3. A method of preparing a stable, modified-starch paste which comprises partially hydrolyzing starch in a wet way to form a paste, adjusting the pH between 7 and about 10, adding between one and twelve parts of a water-soluble carbamide-aldehyde reaction product for each four parts of starch used in preparing the paste, and heating the mixture above 80° C.

4. A method of preparing a stable, modified-starch paste which comprises partially hydrolyzing starch in a wet way to form a paste, adjusting the pH between 7 and about 10, adding between one and twelve parts of a water-soluble urea-formaldehyde reaction product for each four parts of starch used in preparing the paste, and heating the mixture above 80° C.

5. A method of preparing a stable, modified-starch paste which comprises swelling starch with heat and water, acting upon the swelled starch with a diastatic enzyme until a desired degree of fluidity is reached, inactivating the enzyme, adjusting the pH between 7 and about 10, adding between one and twelve parts of a water-soluble urea-formaldehyde reaction product for each four parts of starch taken for the paste and heating the mixture thus obtained above 80° C.

6. A method of preparing a stable, modified starch paste which comprises swelling starch with heat and water, acting upon the swelled starch with a diastatic enzyme until a desired degree of fluidity is reached, inactivating the enzyme, adjusting the pH between 7 and about 10, adding between one and twelve parts of dimethylol urea for each four parts of starch taken for the paste, and heating the mixture thus obtained above 80° C.

7. The product obtained by the method of claim 1.

8. The product obtained by the method of claim 4.

9. The product obtained by the method of claim 6.

SIVERT N. GLARUM.
JOSEPH J. THOMAS.